United States Patent [19]

Nagano

[11] Patent Number: 4,759,230
[45] Date of Patent: Jul. 26, 1988

[54] BRAKING DEVICE FOR A BICYCLE
[75] Inventor: Masashi Nagano, Izumi, Japan
[73] Assignee: Shimano Industrial Company Limited, Osaka, Japan
[21] Appl. No.: 41,486
[22] Filed: Apr. 23, 1987
[30] Foreign Application Priority Data
  Apr. 26, 1986 [JP] Japan .................. 61-97457
  Dec. 18, 1986 [JP] Japan ................. 61-302199
[51] Int. Cl.$^4$ .................. B62K 23/06; B62L 3/02
[52] U.S. Cl. .................. 74/489; 74/501 B; 188/24.12
[58] Field of Search .................. 74/489, 501 B, 501 F; 188/24.12, 24.21

[56] References Cited
U.S. PATENT DOCUMENTS

| | | | |
|---|---|---|---|
| 2,160,181 | 5/1939 | Taylor | 188/24.21 X |
| 3,403,577 | 10/1968 | Ozaki . | |
| 3,596,530 | 8/1971 | Yoshigai . | |
| 3,997,030 | 12/1976 | Yoshigai . | |
| 4,023,653 | 5/1977 | Yoshigai | 74/489 X |
| 4,267,746 | 5/1981 | Pruett | 74/489 |
| 4,304,145 | 12/1981 | Shimano | 74/489 X |
| 4,526,057 | 7/1985 | Mochida et al. | 74/501 R |
| 4,674,353 | 6/1987 | Yoshigai | 74/489 |

FOREIGN PATENT DOCUMENTS

| | | | |
|---|---|---|---|
| 1011306 | 6/1957 | Fed. Rep. of Germany | 74/489 |
| 581837 | 10/1924 | France | 74/501 B |
| 523976 | 11/1954 | France | 74/489 |

Primary Examiner—Allan D. Herrmann
Attorney, Agent, or Firm—Stevens, Davis, Miller & Mosher

[57] ABSTRACT

A braking device for a bicycle comprising a brake lever, brakes and a control wire for connecting the brake lever with the brakes, the brake lever provided with a lever spring for restoring the same from its operating position to the original position, in which a spring force of the lever spring and that of a brake spring provided at the brakes are set so that a lever turning force is 900 g or less and a lever restoring force is 100 g or more when a ratio of the lever turning force to the lever restoring force is 40% or more.

5 Claims, 3 Drawing Sheets

FIG. 3
| $F_2/F_1$ | professionals | | | General Clerks | | | General Business Girls | | |
|---|---|---|---|---|---|---|---|---|---|
| | A group | B group | C group | A group | B group | C group | A group | B group | C group |
| 25 | × | × | × | × | × | × | × | × | × |
| 30 | △ | △ | △ | × | × | × | × | × | × |
| 35 | ○ | △ | ○ | △ | × | △ | × | △ | × |
| 40 | ○ | ○ | ○ | ○ | ○ | ○ | ○ | ○ | △ |
| 45 | ○ | ○ | ○ | ○ | ○ | ○ | ○ | ○ | ○ |
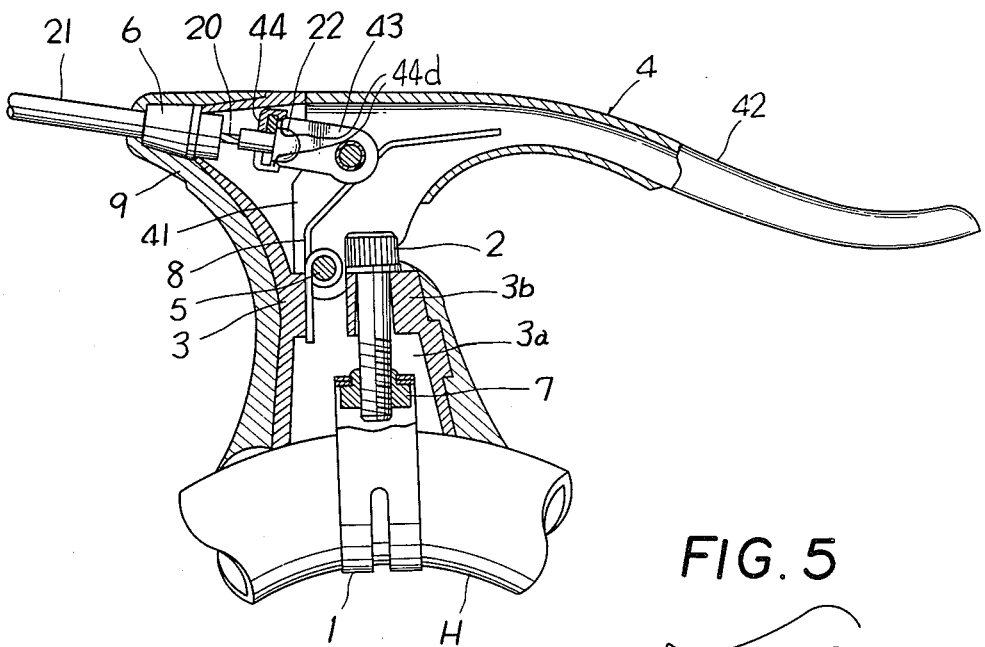
FIG. 4
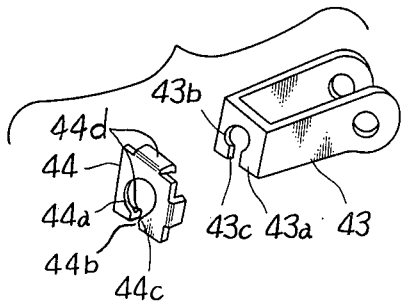
FIG. 5

BRAKING DEVICE FOR A BICYCLE

FIELD OF THE INVENTION

The present invention relates to an improvement in a braking device for a bicycle, and more particularly to an improvement in a braking device comprising a brake lever, brake means each having a brake spring and operated by the brake lever, and a control wire for transmitting operation of the brake lever to operating members at the brake means.

BACKGROUND OF THE INVENTION

A conventional bicycle braking device comprising a brake lever and brake means operated thereby, is disclosed in Japanese Utility Model Publication Gazette No. Sho 55-23,009. Such braking device is provided between a pair of brake arms of, for example, a caliper brake, with a brake spring which restores the brake arms from the operating positions thereof to the original rest positions after the brake lever is released, by the cyclist the brake lever being restored from the operating position to the original position through the control wire connecting the brake arms and brake lever.

In brief, all heretofore known conventional braking devices have been provided at the brake means only with a brake spring for restoration so as to restore the actuating members, such as the brake arms, and also the brake lever.

The brake spring for lever restoration, in consideration of deterioration of a transmission efficiency of the control wire after long use, has a large spring force (usually approximately 4 kg) to restore the brake lever from the actuating position thereof to the original position.

Hence, a brake spring of having a large spring force as described above, is heavy to operate even when the control wire has a proper transmission efficiency $\lambda W$, and moreover becomes further heavier when the efficiency $\lambda W$ is deteriorated.

SUMMARY OF THE INVENTION

An object of the invention is to provide an improvement in a braking device for a bicycle which is provided at a brake lever with a lever spring to restore the brake lever from its operating position to the original or rest position and which enables the spring force of the brake spring for the brake means to be smaller than the conventional device, thereby enabling a light touch braking action with a small force to turn the lever. At the same time, the ratio of the lever restoring force when the lever is released to the lever turning force is made larger. Hence, the lever is quickly restored to the original position while the lever turning force is reduced, thereby sufficiently obtaining a feeling of moderation in the braking action.

The present invention sets a spring force of the brake spring to be 4 kg as in the conventional caliper brake. When a large number of persons are subjected to a feeling test using as a standard a lever turning force $F_1$ of 1.7 kg, it has been found that all of them experience the device as having a light touch when under 900 g and experience the touch as not so different from the standard value when over 900 g. In a case where the lever turning force $F_1$ is under 900 g, when the ratio of the lever restoring force $F_2$ to the lever turning force $F_1$, that is, the lever restoring-turning ratio $F_2/F_1$, is smaller, there is no feeling of moderation, resulting in a poor braking feeling.

In order to solve the above problem, the present invention has been designed. In a braking device for a bicycle comprising a brake lever, brake means having a brake spring and operated by the brake lever, and a control wire for transmitting the operation of the brake lever to the brake means, the improvement is provided wherein the brake lever is provided with a lever spring for restoring the brake lever from an operating position to its original rest position. The improvement provides that, when a lever turning force for operating the brake lever to pull the control wire is represented by $F_1$ and a lever restoring force for restoring the brake lever by the lever spring and brake spring is represented by $F_2$, a spring force $K_1$ of the brake spring and spring force $K_2$ of the lever spring are set such that $F_1$ becomes 900 g or less and $F_2$ becomes 100 g or more at a ratio of $f_2/F_1$ of 40% or more.

Accordingly, the braking device of the present invention exerts braking action by a lever turning force of 900 g or less, thereby enabling the braking action to be achieved with a light touch and reduction of a time until the brake shoes contact with a braked member, such as a wheel rim. Also, the brake lever, when released, can be restored precisely to the original position in a good feeling of moderation.

Generally, a lever ratio at the brake lever, that is, a ratio a/b of a length a between the working point of the operating force for the brake lever and the center of swinging motion thereof to a length b between the swinging motion center and the retaining point to retain the lever, is usually 4.5, and the operating efficiency $\lambda A$ of the brake spring is 80%. Under these conditions, when the operating efficiency $\lambda B$ of the lever spring is 85%, it is preferable to set a spring force $K_1$ of the brake spring at 1.100 g or less and spring force $K_2$ of the lever spring on the basis of the set spring force $K_1$ so that the lever turning force $F_1$ becomes about 900 g or less and the lever restoring force $F_2$ becomes about 100 g or more when the transmission efficiency $\lambda W$ of the control wire is 35%.

The above and further objects and novel features of the invention will be more fully apparent from the following detailed description when the same is read in connection with the accompanying drawings.

BRIEF DESCRIPTION OF THE DRAWINGS

FIG. 3 is a graph showing the test data for a feeling of moderation, FIG. 4 is a sectional view of another embodiment of a brake lever, and FIG. 5 is a perspective partial exploded view of a retainer.

DETAILED DESCRIPTION OF THE INVENTION

Figure 1:
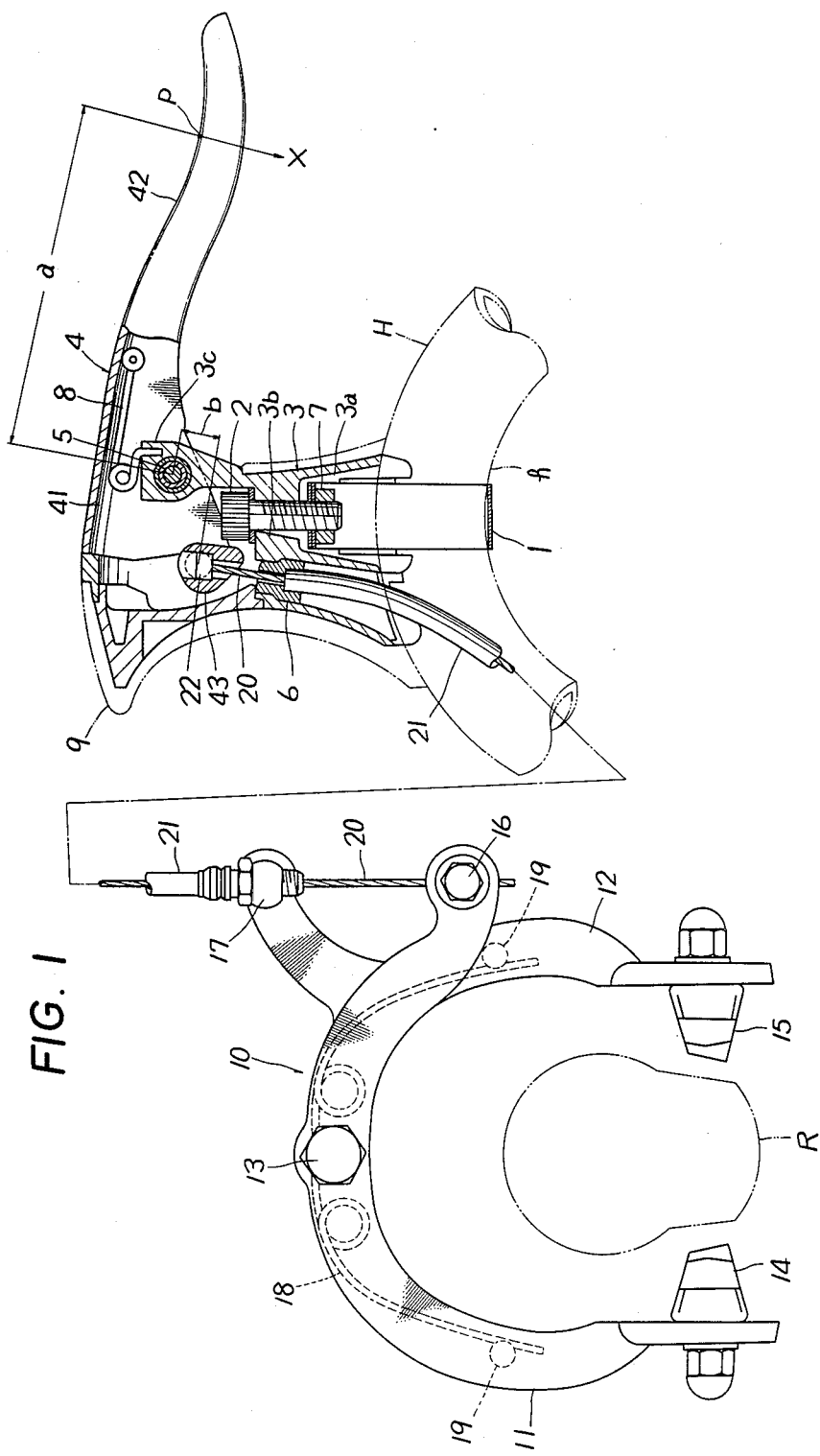
FIG. 1 is an illustration of an embodiment of a braking device of the invention.

Referring to FIG. 1, a bracket member 3 is fixed to a bent rod section h at a drop handle H of the bicycle through a band 1 and a tightening member 2 tightly screwing therewith. A brake lever 4 having a base 41 and an operating portion 42 is swingably supported at the base 41 to the bracket member 3 through a lever shaft 5, and a side-pull type caliper brake 10 is used as a brake means.

The bracket member 3 is rectangular in section and has a cavity 3a in which an intermediate wall 3b is provided. The tightening member 2 is insertably supported to the intermediate wall 3b, and a control wire 20 connecting the brake lever and brake means 10 is inserted through the wall 3b. An end piece 6 for an outer sheath 21 guiding the control wire 20 is fixed to the same.

The bracket member 3 is fixed to the handle H by screwing the tightening member 2 with a nut 7 coupled with the band 1.

The brake lever 4 is swingably supported at the base 41 through the lever shaft 5 to a support wall 3c projecting upwardly from the intermediate wall 3b at the bracket member 1, the base 41 having at its front a retainer 43 for retaining an end piece 22 of the control wire 20.

In addition, the retainer 43 is cylindrical and does not have a slit so as to prevent the end piece 22 from escaping from the retainer 43 even when the transmission efficiency of the wire 20 diminishes to restore only the brake lever 4 by a lever spring 8 to be discussed below.

The brake lever 4 is subjected to an operating force in the direction of the arrow X through operating portion 42 gripped by a cyclist. A lever ratio of a/b a distance a between the working point p and the axis of the lever shaft 5 to distance b between the axis, of shaft 5 and the lengthwise center of the retainer 43 for receiving the end piece 22 is set preferably at 4.5.

The lever ratio a/b can be set as desired, but usually it is preferably set at 4.5, but generally desirable settings are 3.0 through 5.0.

Between the brake lever 4 and the bracket member 3 is provided a lever spring 8 to restore the brake lever 4 from the operating position thereof to the original or rest position.

The lever spring 8 abuts at one end thereof against the inner surface of the operating portion 42 of the brake lever 4, is retained at its other end to the support wall 3c at the bracket member 3, and is coiled at an intermediate portion thereof.

At the side-pull type caliper brake 10, a pair of brake arms 11 and 12 function as operating members and are pivotally supported to a pivot shaft 13. Brake shoes 14 and 15 each having a braking surface opposite to a wheel rim R at the bicycle are held by the brake arms 11 and 12. A holder 16 for the control wire 20 is provided at one of the brake arms 11 and 12, and a receiving member 17 for the outer sheath 21 is provided at the other. Between the pivot shaft 13 and the respective brake arms 11 and 12 is provided a brake spring 18 for restoring each brake arm 11 or 12 from the operating position to its original portion.

In addition, in FIG. 1, reference numeral 9 designates a bracket cover and 19 designates stoppers for the brake spring 18.

The braking device of the invention provides lever spring 8 and brake spring 18 as described above and also sets spring forces $K_1$ and $K_2$ of Springs 8, 18 as follows.

When a lever turning force for turning the brake lever 4 to pull the control wire 20 is represented by $F_1$ and a lever restoring force for restoring the same by the lever spring 8 and brake spring 18 is represented by $F_2$, the spring forces $K_1$ and $K_2$ are set so that $F_1$ is 900 g or less and $F_2$ is 100 g or more at the brake lever turning-restoring ratio $F_2/F_1$ of 40% or more.

The reason for setting the lever turning force $F_1$ at 900 g or less is that the usual caliper brake building therein a brake spring of spring force of 4 kg has been subjected to a sensory test applied to a number of people on the basis of the lever turning force for operating the brake lever. As a result, all of the people tested concluded the lever turning is light when $F_1$ is under 900 g, and not so different from the standard value when $F_1$ is over 900 g. Also, the reason for setting the lever restoring force $F_2$ at 100 g or more is that, when $F_2$ is under 100 g, the brake lever 4 returns slowly to give an uneasy feeling to the cyclist on the braking action.

The reason for setting $F_2/F_1$ at 40% or more is as follows FIG. 3, shows test results obtained from tests undergone by various groups of bicyclists such as professionals, amateur racers (bicycle designers) highly interested in bicycles, general clerks and general business girls In FIG. 3, circles indicate that every person tested experienced a good, moderate feeling during brake operation; triangles indicate that some people tested had such feeling while others did not; and X's indicate that no one tested experienced such feeling. As shown in FIG. 3, the people undergoing the tests were divided into three groups with each group having 10 people and the indications of moderate lever operation by the respective groups were averaged with the result that almost all of the tested individuals felt, at an $F_2/F_1$ ratio of 40 to 45%, that the brake lever 4 is restored to the original position with a good feeling of moderation and the majority of them experienced a poor feeling of moderation at an $F_2/F_1$ ratio of 40% or less.

In addition, the lever 4 turning force $F_1$ is given in the following equation:

$$F_1 = \frac{(K_1/\sqrt{\lambda A}/\lambda W) + (K_2/\sqrt{\lambda B})}{R} \quad (1)$$

and the lever 4 restoring force $F_2$ is given in the following equation:

$$F_2 = \frac{K_1 \cdot \sqrt{\lambda A} \cdot \lambda W + K_2 \cdot \sqrt{\lambda B}}{R} \quad (2)$$

where $\lambda A$ is an operating efficiency of the brake spring 18, $\lambda B$ is that of the lever spring 8, $\lambda W$ is a transmission efficiency of the control wire 2, and R is a lever ratio a/b of the brake lever 4.

For setting the spring forces $K_1$ and $K_2$ of the brake spring 18 and lever spring 8, the lever ratio R, brake spring operating efficiency $\lambda A$ and lever spring operating efficiency $\lambda B$ are set on the basis of the standard design value.

Specifically, the lever ratio is set 4.5, the brake spring operating efficiency $\lambda A$ is set at 80%, the lever spring operating efficiency $\lambda B$ is set at 85%, and the transmission efficiency $\lambda W$ of the control wire 20 is set at 65% as usual. Under these conditions, when the lever turning force $F_1$ is set at 900 g or less, the spring forces $K_1$ and $K_2$ of the brake spring 18 and lever spring 8 are given from the equation (1) in the following expression:

$$K_2 \leq -1.586 K_1 + 3734$$

whereby the spring forces $K_1$ and $K_2$ are set on the basis of the coordinate system within a range of the rightwardly downward line graph A.

Figure 2:
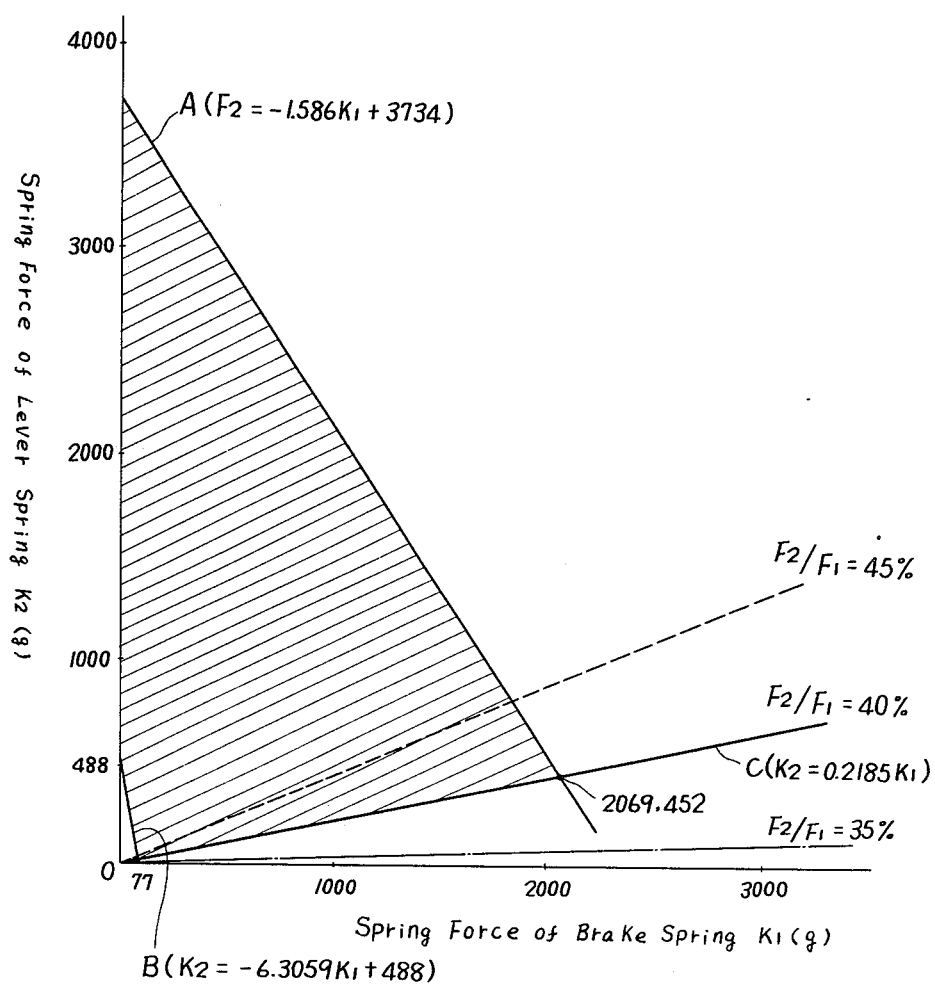
FIG. 2 is a graph showing the relationship between a spring force of a brake spring and that of a lever spring.

When the lever restoring force is set at 100 g or more under the aforesaid condition, both the spring forces $K_1$ and $K_2$ are given from the equation (2) in the following expresion:

$$K_2 \gtreqless -16.3059K_1 + 488,$$

whereby both the spring forces $K_1$ and $K_2$ are set on the basis of the coordinate system in a range put between the rightwardly downward line graph A and a rightwardly downward line graph B in FIG. 2.

When the lever turning-restoring efficiency $F_2/F_1$ under the aforesaid condition is set at 40% or more, from the equations (1) and (2), $$K_2 \gtreqless 0.2185K_1$$

is obtained,
whereby both the spring forces $K_1$ and $K_2$ are set on the basis of the coordinate system in a range surrounded on three sides of a rightwardly upward line graph C and the aforesaid line graphs A and B in FIG. 2.

Thus, the spring forces $K_1$ and $K_2$ are set in desirable strength and within the hatched area surrounded by the line graphs A, B and C in FIG. 2.

Incidentally, when the spring force $K_1$ is set at 800 g and that $K_2$ at 600 g, the lever turning force $F_1$ is 499 g and the lever restoring force $F_2$ is 206 g, whereby the braking action in a light touch is possible and a good feeling of moderation for the braking action is obtainable.

When $K_1$ is set at 700 g and that $K_2$ at 800 g, $F_1$ is 500 g and $F_2$ 232 g, whereby the braking action in a light touch and in a good feeling of moderation is exerted.

It is preferable that under the aforesaid condition that the lever ratio $R = a/b$ at the brake lever 4 is set at 4.5, the brake spring operating efficiency $\lambda A$ at 80%, and the lever spring operating efficiency $\lambda B$ at 85%, $F_1$ becomes about 900 g or less and $F_2$ about 100 g or more when the control wire transmission efficiency $\lambda W$ is 35%. In this case, the spring force $K_1$ is set at 1,100 g or less and the spring force $K_2$ is set on the basis of the set spring force $K_1$.

In such construction, the reason for setting the transmission efficiency $\lambda W$ of the control wire 20 at 35% is to expect safety, because the transmission efficiency may lower after long use. Hence, there is no need of setting the aforesaid condition when a control wire of high quality is used to keep its transmission efficiency deteriorated very slightly.

In addition, in the present invention, the brake spring 18 may have a minimum spring force $K_1$ in order to move the brake shoes away from the wheel rim R when the brake lever 4 is released.

In this case, the minimum spring force $K_1$ allows the lever spring 8 to have a relatively strong spring force $K_2$.

The control wire 20 in the brake lever 4 in FIG. 1 is introduced into the lower portion of the bracket member 3 and extends toward the brake means 10 through the handle H. Alternatively, the wire 20 may be inserted through the front wall of the bracket member 3 and fixed to the brake lever 4 and the end piece 6 for the outer sheath 21 may be held to the front wall.

In this case, to the base 41 of brake lever 4 is pivoted a retainer 43 for retaining the end piece 22 of the wire 20.

The retainer 43, similarly to that shown in FIG. 1, is constructed to prevent the end piece 22 from escaping from the retainer 43 even when the brake lever 4 alone returns by the brake spring 8. The retainer 43 in the embodiment in FIG. 4 is substantially shaped as shown in FIG. 5 and has a connecting piece 43a provided with an insertion bore 43b for the end piece 22 and an insertion slit 43c for the control wire 20. A locking cap 44 having an insertion bore 44a for the end piece 22, an insertion slit 44b for the wire 20 and a restricted portion 44c formed on the way of the slit 44b, is formed and fixed via upper and lower tabs 44d as shown in FIG. 4 to the retainer 43, thereby preventing the wire 20 from escaping therefrom.

In the above-described embodiment, a side-pull type caliper brake 10 is used, but a center-pull type caliper brake, a rim brake, a cantilever brake, a drum brake, or a hub brake such as a hand brake, can be used with the invention, since these types of brakes have an actuating member and exert the braking action by operating brake lever 4 through a control wire 20.

Also alternatively, a brake lever 4 may be applied to a flat handle or an up handle other than a drop handle and any type of brake lever 4 can be used.

As seen from the above, the improved braking device of the invention constructed as described above can exert braking action with a light touch and with a good feeling of moderation and can also reduce the time required for the brake shoes of the brake means 10 to contact with the braked member, such as the wheel rim, in comparison with a conventional braking device provided with a brake spring of larger spring force which functions also to restore the brake lever.

Although several embodiments have been described, above they are merely exemplary of the invention and not to be construed as limiting, the invention being defined solely by the appended claims.

What is claimed is:

1. A braking device for a bicycle comprising a brake lever, a brake means having a brake spring, a control wire for transmitting operation of said brake lever to said brake means, and a lever spring for restoring said brake lever to an original position from an operating position to which said brake lever is moved by an operator to actuate said brake means, a spring force $K_1$ of said brake spring and a spring force $K_2$ of said lever spring being set within a range such that (i) $K_2 \leqq -1.586K_1 + 3734$; (ii) $K_2 \geqq -6.3059K_1 + 488$; and (iii) $K_2 \geqq 0.218K_1$, so that a lever turning force $F_1$ required to move said brake lever to pull said control wire is 900 g or less, and a lever restoring force $F_2$ required to restore said brake lever by said brake spring and said lever spring is 100 g or more, a lever turning-restoring ratio $F_2/F_1$ for said brake lever being set at 40% or more.

2. A braking device for a bicycle, comprising a brake lever, a brake means having a brake spring, a control wire for transmitting operation of said brake lever to said brake means, and a lever spring for restoring said brake lever to an original position from an operating position to which said brake lever is moved by an operator to actuate said brake means, a spring force $K_1$ of said brake spring and a spring force $K_2$ of said lever spring being set so that a lever turning force $F_1$ required to move said brake lever to pull said control wire is 900 g or less, and a lever restoring force $F_2$ required to restore said brake lever by said brake spring and said lever spring is 100 g or more, with a lever turning-restoring ratio $F_2/F_1$ for said brake lever being set at 40% or more, wherein said spring force $K_1$ of said brake spring is set at 1,100 g or less under a condition that a ratio a/b of a distance a between a working point of an operating force to be applied to said brake lever and a center of swinging motion of said brake lever to a distance b between said center of swinging motion and a retaining point at which said control wire is retained to said brake lever is set at 4.5, an operating efficiency of said brake spring is set at 80%, an operating efficiency of said lever spring is set at 85%, and a transmission efficiency of said control wire is set at substantially 35%.

3. A braking device for a bicycle comprising a brake lever, a brake means having a brake spring, a control wire for transmitting operation of said brake lever to said brake means, and a lever spring for restoring said brake lever to an original position from an operating position to which said brake lever is moved by an operator to actuate said brake means, a spring force $K_1$ of said brake spring and a spring force $K_2$ of said lever spring being set within a range such that (i) $K_2 \leq -1.586 K_1 + 3734$; (ii) $K_2 \geq -6.3059 K_1 + 488$; and (iii) $K_2 \geq 0.2185 K_1$, so that a lever turning force $F_1$ required to move said brake lever to pull said control wire is 900 g or less, and a lever restoring force $F_2$ required to restore said brake lever by said brake spring and said lever spring is 100 g or more, a lever turning-restoring ratio $F_2/F_1$ for said brake lever being set at 40% or more, under a condition that a ratio a/b of a distance a between a working point of an operating force to be applied to said brake lever to a distance b between said center of swinging motion and a retaining point at which said control wire is retained to said brake lever is set at 4.5, an operating efficiency of said brake spring is set at 80%, an operating efficiency of said lever spring is set at 85%, and a transmission efficiency of said control wire is set at substantially 65%.

4. The braking device for a bicycle according to claim 3, wherein said control wire is provided at one lengthwise end thereof with an end piece retained to said brake lever, said brake lever is provided with a retainer for retaining said end piece, and said retainer is provided with a lock member for preventing said end piece from escaping from said retainer.

5. The braking device for a bicycle as in claim 3, wherein said spring force $K_1$ of said brake spring is set at 1,100 g or less.

* * * * *